(12) United States Patent
Pritchard et al.

(10) Patent No.: US 7,675,931 B1
(45) Date of Patent: Mar. 9, 2010

(54) METHODS AND APPARATUS FOR CONTROLLING MULTIPLE MASTER/SLAVE CONNECTIONS

(75) Inventors: Jeffrey Orion Pritchard, Santa Cruz, CA (US); Michael C. Fairman, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 1156 days.

(21) Appl. No.: 11/270,427

(22) Filed: Nov. 8, 2005

(51) Int. Cl.
*H04L 12/66* (2006.01)
(52) U.S. Cl. .................................... 370/463
(58) Field of Classification Search ........................ None
See application file for complete search history.

(56) References Cited

U.S. PATENT DOCUMENTS

| | | | | |
|---|---|---|---|---|
| 5,191,649 | A * | 3/1993 | Cadambi et al. | 709/225 |
| 6,279,055 | B1 * | 8/2001 | Ito et al. | 710/45 |
| 6,788,681 | B1 * | 9/2004 | Hurren et al. | 370/389 |
| 7,181,485 | B1 * | 2/2007 | Lau et al. | 718/100 |
| 7,277,425 | B1 * | 10/2007 | Sikdar | 370/366 |
| 7,324,547 | B1 * | 1/2008 | Alfieri et al. | 370/461 |
| 7,362,772 | B1 * | 4/2008 | Alfieri et al. | 370/429 |
| 7,397,794 | B1 * | 7/2008 | Lacroute et al. | 370/367 |
| 7,397,846 | B1 * | 7/2008 | Beser | 375/222 |
| 7,447,149 | B1 * | 11/2008 | Beesley et al. | 370/217 |
| 7,447,197 | B2 * | 11/2008 | Terrell et al. | 370/360 |
| 7,460,488 | B2 * | 12/2008 | Mayernick | 370/254 |
| 7,478,178 | B2 * | 1/2009 | Torudbakken et al. | 710/31 |
| 2004/0054822 | A1 * | 3/2004 | Biran et al. | 710/15 |
| 2004/0252685 | A1 * | 12/2004 | Kagan et al. | 370/389 |
| 2005/0063394 | A1 * | 3/2005 | Ko | 370/397 |
| 2005/0141447 | A1 * | 6/2005 | Carlton et al. | 370/328 |
| 2005/0209842 | A1 * | 9/2005 | Klein | 703/25 |
| 2005/0226265 | A1 * | 10/2005 | Takatori | 370/452 |
| 2005/0256976 | A1 * | 11/2005 | Susairaj et al. | 710/3 |
| 2007/0147522 | A1 * | 6/2007 | Seto et al. | 375/260 |
| 2007/0297345 | A1 * | 12/2007 | Zhang | 370/254 |
| 2009/0138881 | A1 * | 5/2009 | Anand et al. | 718/104 |
| 2009/0138882 | A1 * | 5/2009 | Anand et al. | 718/104 |
| 2009/0138885 | A1 * | 5/2009 | Anand et al. | 718/104 |
| 2009/0138886 | A1 * | 5/2009 | Anand et al. | 718/104 |

OTHER PUBLICATIONS

Timothy Allen, et al., "Providing Component Connection Information", U.S. Appl. No. 10/956,458, filed Sep. 30, 2004.
Timothy Allen, et al., "Providing Component Connection Information", U.S. Appl. No. 60/606,966, filed Sep. 3, 2004.

(Continued)

*Primary Examiner*—Gregory B Sefcheck
(74) *Attorney, Agent, or Firm*—Weaver Austin Villeneuve & Sampson LLP

(57) ABSTRACT

Techniques and mechanisms provide various representations and/or the ability to control component interconnections in an electronic design. For example, virtual representations, which may be combined with physical representations, of actual hardware connections between components of an electronic design are provided. A virtual port is generally mapped to a hidden physical port, which corresponds to an actual hardware port of a particular component. The virtual port may be mapped to multiple hidden physical ports or mapped to a single hidden physical port shared by another virtual port. The mapping may also take into account various constraints (e.g., functionalities supported by the components selected for connection; burst data transfers; prefetchable memory reads; etc.) to allow for efficient control and/or presentation of interconnection information. Based on the mappings, components can be automatically connected. As such, the creation and understanding of an electronic design is made easier and clearer to the user.

26 Claims, 13 Drawing Sheets

OTHER PUBLICATIONS

Altera Corporation, 70 page document entitled, "Excalibur, Nios Tutorial", Document Version 1.1, Document date Apr. 2002, Copyright 2002, http://www.altera.com/literature/tt/tt_nios_hw_apex_20k200e.pdf.

Altera Corporation, 14 page document entitled, "Quartus II Handbook, vol. 1, 2. System Design Using SOPC Builder", Dec. 2004, qii51003-2.1, http://www.altera.com/literature/hb/qts/qts_qii51003.pdf.

Altera Corporation, 14 page document entitled, "Quartus II Handbook, vol. 4, 2. Tour of the SOPC Builder User Interface", Feb. 2005 QI154002-1.0, http://www.altera.com/literature/hb/qts/qts_qii54002.pdf.

www.xlinx.com, "Embedded System Tools Reference Manual, Embedded Development Kit, EDK 7,1i,"Feb. 15, 2005, Chapters 2-4.

* cited by examiner

METHODS AND APPARATUS FOR CONTROLLING MULTIPLE MASTER/SLAVE CONNECTIONS

BACKGROUND

1. Field of the Invention

The present invention generally relates to electronic designs. More specifically, the invention relates to apparatus and methods for controlling and/or presenting multiple component connections of an electronic design, especially when the electronic design is created with the use of system design tools.

2. Description of Related Art

A system design tool, such as SOPC (System-on-a-Programmable-Chip) Builder available from Altera Corporation of San Jose, Calif., is generally used to create an electronic design. The system design tool may also be used to facilitate implementation of the electronic design in a target hardware device (e.g., programmable chip). Typically, the electronic design includes various interconnected components. For example, the electronic design may include interconnected master components and slave components. Controlling the connections between various components and/or how they are presented to a user (e.g., designer) would be helpful in creating the electronic design.

Conventional mechanisms for controlling and/or presenting component interconnections are limited. More specifically, system design tools present the user with only a physical representation of component interconnections. For example, connections between masters and slaves shown on a patch panel represent fixed (physical) links in the SOPC system. The physical representation of component interconnections merely conveys to the user information on how the component connections actually appear in hardware. This information may either be too much or too little for the user to efficiently use to create the electronic design. For example, the physical representations may lack information on which physical master port would be suitable for connection to a particular physical slave port. The user would be burdened with making the correct connections. For another example, the physical representations may cause confusion by including too much unnecessary detail. Making the appropriate connections can sometimes be burdensome and error prone.

Consequently, it would be beneficial to have improved mechanisms and techniques for controlling and/or presenting component interconnections, thereby, allowing for the efficient creation of the electronic design.

SUMMARY

The techniques and mechanisms of the present invention provide various representations and/or the ability to control component interconnections in an electronic design. For example, a virtual representation of at least a part of the component interconnections is presented. The virtual representation is mapped to a physical representation, which corresponds to an actual hardware representation of the component interconnections. The mapping may take into account various constraints (e.g., a functionality supported by the components; burst data transfers; prefetchable memory reads; etc.) that allows for efficient control and/or presentation of component interconnections. As such, the creation and understanding of a design is made easier and clearer.

In one aspect of the present invention, a method of interconnecting components in an electronic design is provided. First and second components are received along with an indication to connect the first component to the second component. A first virtual port associated with the first component is connected to the second component. The first virtual port includes a mapping to a first physical port associated with the first component.

In another aspect of the present invention, a computer system for interconnecting components in an electronic design is provided. The computer system includes an interface and a processor. The interface is configured to receive a first component, a second component, and an indication to connect the first component to the second component. The processor is coupled to the interface. The processor is configured to connect a first virtual port associated with the first component to the second component. The first virtual port includes a mapping to a first physical port associated with the first component.

In yet another aspect of the present invention, a computer program product including a machine-readable medium is provided. The machine-readable medium has program instructions for interconnecting components in an electronic design. The program instructions include instructions for receiving a first component; instructions for receiving a second component; instructions for receiving an indication to connect the first component to the second component; and instructions for connecting a first virtual port associated with the first component to the second component. The first virtual port includes a mapping to a first physical port associated with the first component.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1A:
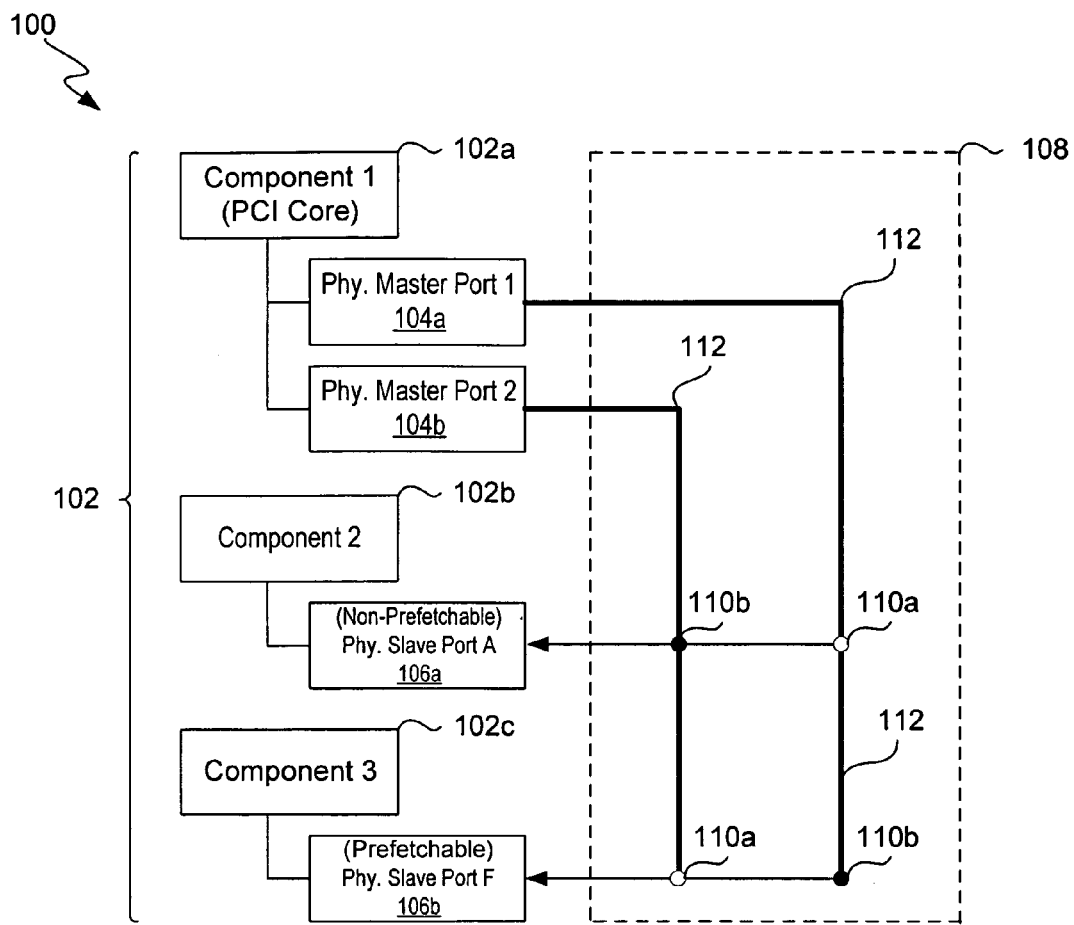
FIG. 1A illustrates a physical representation of an electronic design according to a first embodiment of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For instance, the techniques of the present invention will be described in the context of particular system design tools. However, it should be noted that the techniques of the present invention can be applied to a variety of tools and associated code provided with the tools. In the following description, numerous specific details are set forth in order to provide a thorough understanding of the present invention. The present invention may be practiced without some or all of these specific details. In other instances, well known process operations have not been described in detail in order not to unnecessarily obscure the present invention.

INTRODUCTION

According to various embodiments, the techniques of the present invention provide numerous representations and/or mechanisms for controlling component interconnections in an electronic design. For example, aspects of the invention provide virtual representations, which may be combined with physical representations, of actual hardware connections between electronic design components. A virtual port is generally mapped to a hidden physical port, which corresponds to an actual hardware port of a particular component. The virtual port may be mapped to multiple hidden physical ports or mapped to a single hidden physical port shared by another virtual port. The mapping may also take into account various constraints (e.g., functionalities supported by the components selected for connection; burst data transfers; prefetchable memory reads; etc.) to allow for efficient control and/or presentation of interconnection information. Based on the mappings, components can be automatically connected. As such, the creation and understanding of a design is made easier and clearer to the user.

While system design tools are widely used in the industry, they have not yet been implemented where interconnections are provided and/or controlled in such a manner that the user is not burdened with unnecessary details of making the proper connections. Generally, a designer analyzes data (e.g., port information) from several related components (e.g., slave components having the same master component) simultaneously in order to make informed decisions. For instance, in the case of a multiple master component system in which each master component has numerous ports for connecting slave components, it would be useful to display each port either as a physical port or as a virtual port depending on the level of information to be provided to the user.

It is important to note that aspects of the present invention recognize that it is sometimes preferable to present to the user a simple representation of what is actually happening with the component interconnections in the electronic design. Yet other aspects of the present invention recognize that it is sometimes preferable to present to the user a detailed representation of what is actually happening with the component interconnections in the electronic design. By controlling and/or providing component interconnections according to the techniques and mechanisms of the present invention, system design tools can be more useful to users for creating or modifying any portion of an electronic design. Since a system design tool often employs a user interface for providing and receiving information to and from the user, the present invention can improve the clarity of the user interface for creating or modifying the electronic design.

The term "electronic design" generically refers to the logical structure of an electronic device such as an integrated circuit. It may be implemented on hardware (usually referred to herein generically as a "target hardware device"). During the design and development effort, an electronic design may exist in various states or stages. These may include a high level Boolean representation (encoded in a hardware design language for example), a schematic or circuit representation, or any other form representing the logical arrangement of a device. It may include other facets such as floor-plan constraints, waveform constraints, timing constraints, fitting constraints, etc. At the gate level, it may exist as a netlist (whether synthesized or not) prior to placement on a target hardware device. It may even include completed place and route assignments.

An electronic design generally includes multiple components. Each component is representative of a portion of the electronic design. It should be noted that any number of components could be included in the electronic design. According to various embodiments of the present invention, at least one component is interrelated with another component. For example, one component is a primary component while another component is a corresponding secondary component.

Any component or device that is operable to initiate read and/or write operations by providing control information is referred to herein as a primary component. Primary components are sometimes referred to herein as master components. Control information can include a particular address associated with a secondary component. Any component or device that responds to read or write operations with information sent back to the primary component regarding the read or write operation is referred to herein as a secondary component. Secondary components are sometimes referred to herein as slave components. Some examples of primary components include processors, microcontrollers, and Ethernet devices. Some examples of secondary components include Universal Asynchronous Receiver Transmitters (UARTs), Parallel Input Output (PIO), program memory, and data memory. It should be noted that some components such as an Ethernet component can be both a primary component and a secondary component, because an Ethernet component has the capability of reading and writing to the secondary program memory while also responding to instructions from a primary system CPU.

Physical and Virtual Representations

FIG. 1A illustrates a physical representation of an electronic design 100 according to a first embodiment of the present invention. Electronic design 100 includes multiple components 102, such as component 1 (i.e., 102a), component 2 (i.e., 102b), and component 3 (i.e., 102c). In this specific embodiment, component 1 is representative of at least a portion of a PCI Core. Each component may have any number of physical master ports 104 (e.g., 104a, 104b) and/or physical slave ports 106 (e.g., 106a, 106b). For instance, component 1 has two physical master ports 104a and 104b, component 2 has one physical slave port 106a, and component 3 has one physical slave port 106b. Each port may be associated with a particular functionality, such as support for either non-prefetchable or prefetchable memory reads. In general, a physical master port will correspond to a master/primary component whereas a physical slave port will correspond to a slave/secondary component. However, in some cases, a physical master port and a physical slave port may both correspond to a common component such as a master/primary component.

In order to facilitate interconnecting various components, a patch panel 108 is provided in the physical representation of electronic design 100. Patch panel 108 provides interconnection information for components 102. Patch panel 108 includes interconnects 112 and nodes 110a and 110b. Interconnects 112 extend to or from ports 104/106 and are used to interconnect the various ports of components 102. As shown in FIG. 1A, nodes 110a or 110b may be used to receive an indication to connect or disconnect corresponding interconnects 112 and components/ports. An open node 110a denotes a possible connection (e.g., electrical connection) between a pair of components/ports whereas a closed node 110b denotes a made connection (e.g. electrical connection) between a pair of components/ports. Open node 110a may be toggled to closed node 110b and vice versa through a toggling feature. According to one embodiment, the toggling feature includes a user input device such as a mouse, keyboard, or the like, that can be used to change the status of a node. If no nodes are present between intersecting interconnects 112 in patch panel 108, then no connections are available between the pair of components/ports corresponding to the intersecting interconnects 112. Besides the implementation of patch panel 108, it will be appreciated by those skilled in the art that other mechanisms or techniques may be used to interconnect the various ports/components.

Figure 1B:
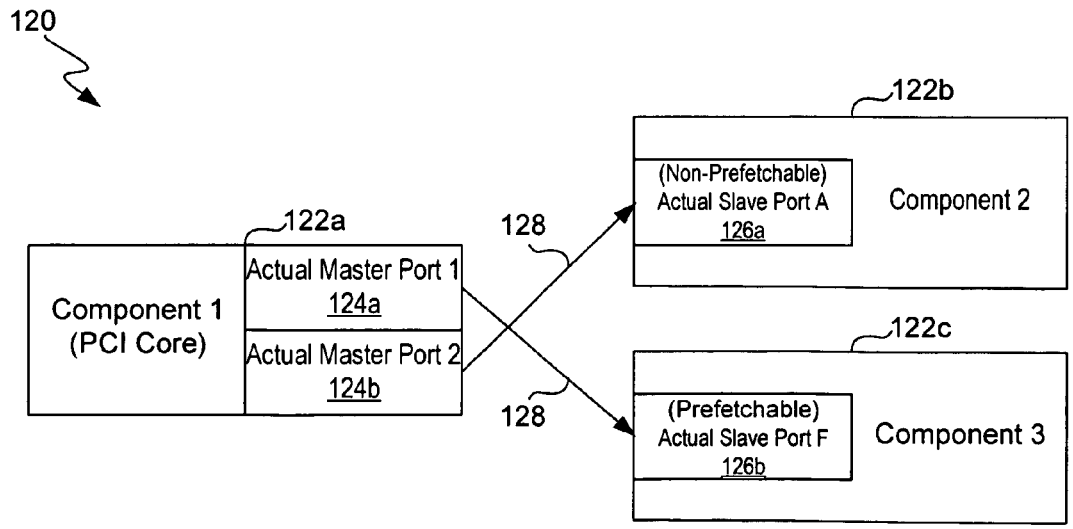
FIG. 1B illustrates a corresponding hardware representation of the electronic design in FIG. 1A.

It should be noted that each physical master/slave port corresponds to an actual hardware port in the electrical design. For instance, the physical master/slave port is a physical representation of the actual hardware port in the electrical design. As such, the physical master/slave port can provide a user with actual hardware connection information. To further elaborate, FIG. 1B illustrates a corresponding hardware representation 120 of the electronic design in FIG. 1A. Component 1 (122a), actual master port 1 (124a), and actual master port 2 (124b) correspond respectively to elements 102a, 104a, and 104b of electronic design 100. Similarly, component 2 (122b), actual slave port A (126a), component 3 (122c), and actual slave port F (126b) correspond respectively to elements 102b, 106a, 102c, and 106b. Actual interconnects 128 are represented by interconnects 112 and nodes 110b of patch panel 108 in FIG. 1A.

In some cases, choosing a correct physical master port to connect to a particular physical slave port may present some challenges to a user. For example, a PCI core (i.e., 102a) may have multiple master ports, e.g. one prefetchable and one non-prefetchable assigned to each BAR (base-address range). Various components in a system are assigned various BARs. For example, a timer may be assigned a BAR of 0x0F900040 to 0x0F90005F. A PCI core may be assigned multiple BARs. Each BAR would be associated with multiple master ports. A user would have to correctly select the appropriate master port even within a particular BAR for connection with a slave port. However, a particular slave component may only be able to handle either prefetching or no fetching and having a user manually select the appropriate master port can be inefficient and error prone. According to various embodiments of the present invention, instead of providing multiple master ports for each BAR, a single virtual master port is provided. The single virtual master port allows a user to more easily and effectively connect master components and slave components. Various techniques and mechanisms of the present invention automatically determine whether the slave component supports prefetching or no prefetching and automatically assigns the slave components to the appropriate prefetching or non-prefetching physical master port.

Figure 2:
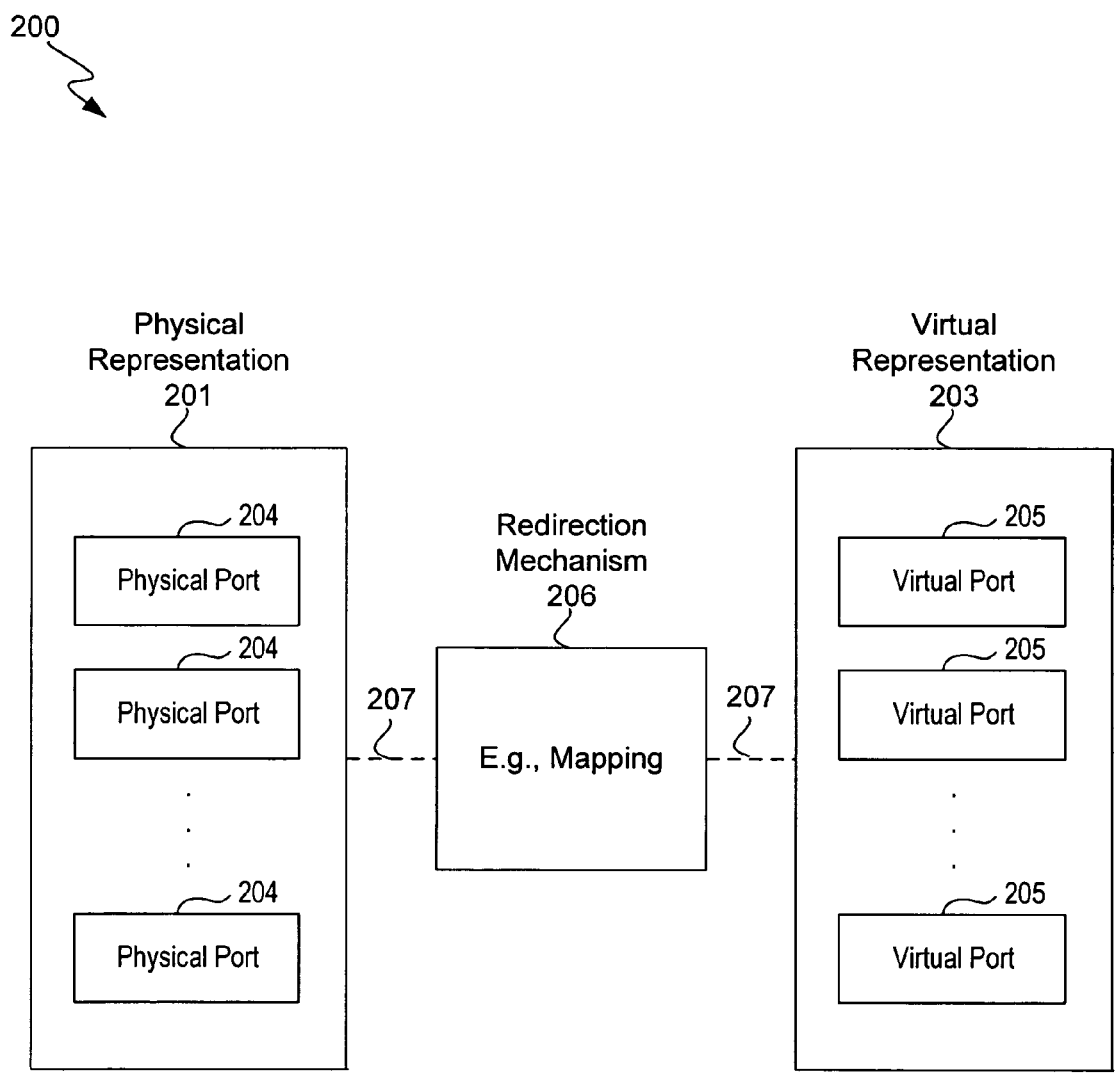
FIG. 2 illustrates virtual connections according to various embodiments of the present invention.

In order to effectively provide information to a user about interconnections in a design and/or control how the interconnections are made, simple and practical visual representations and redirection mechanisms (e.g. mappings) are provided. To further elaborate, FIG. 2 illustrates virtual connections 200 according to various embodiments of the present invention. Virtual connections 200 include interconnects 207, physical representation 201, redirection mechanism 206, and virtual representation 203. Interconnects 207 are operable to link/connect physical representation 201 and virtual representation 203 to a redirection mechanism 206. In other words, interconnects 207 are operable to link/connect physical representation 203 to virtual representation 203 based on redirection mechanism 206. Any part of a component representation that directly represents/correlates to an actual hardware component is referred to herein as a physical representation. Any part of a component representation that indirectly represents/correlates to an actual hardware component is referred to herein as a virtual representation. For example, physical representation 201 may include any number of physical ports 204 whereas virtual representation 203 may include any number of virtual ports 205.

Redirection mechanism 206 is operable to correlate and/or map virtual representation 203 to physical representation 201. For instance, redirection mechanism 206 is operable to map virtual ports 205 to corresponding physical ports 204. Since virtual ports 205 are virtual representations that do not directly represent the actual hardware ports, redirection mechanism 206 can allow the correct physical ports 204 of a component to be identified and used for connecting to the selected physical ports of another component. In a specific embodiment, redirection mechanism 206 provides an indirect method of connecting selected physical slave ports to the physical master ports of selected virtual master ports. It should be noted, however, that redirection mechanism 206 is also operable to verify whether the selected slave component/port (not shown) share a common functionality (e.g., prefetchable memory reads) with a selected virtual master port 205.

Redirection mechanism 206 may employ various mappings between virtual representation 203 and physical representation 201. For instance, the mapping could associate multiple virtual ports to a single physical port, a single virtual port to multiple physical ports, or a single virtual port to a single physical port (e.g., one-to-one mapping). The mapping will generally depend on the particular application. For example, by having more virtual master ports mapped to fewer physical master ports (e.g., where more than one virtual master port is mapped to a common physical master port), the user can be provided with more interconnection information to better select the connections between components/ports. For another example, in reference to component 1 (PCI Core) of FIG. 1, it may be overwhelming to a user if information is provided to the user on which of the physical master ports 104a and 104b within a particular BAR supports prefetchable memory reads. However, by providing a single virtual master port mapped to multiple physical master ports based on supported functionality (e.g., prefetchable memory reads) and/or BAR, the user simply needs to select the single virtual master port and does not need to be burdened with determining which physical master port actually supports prefetchable memory reads. As such, the user can better select the appropriate components/ports for connection.

Figure 3A:
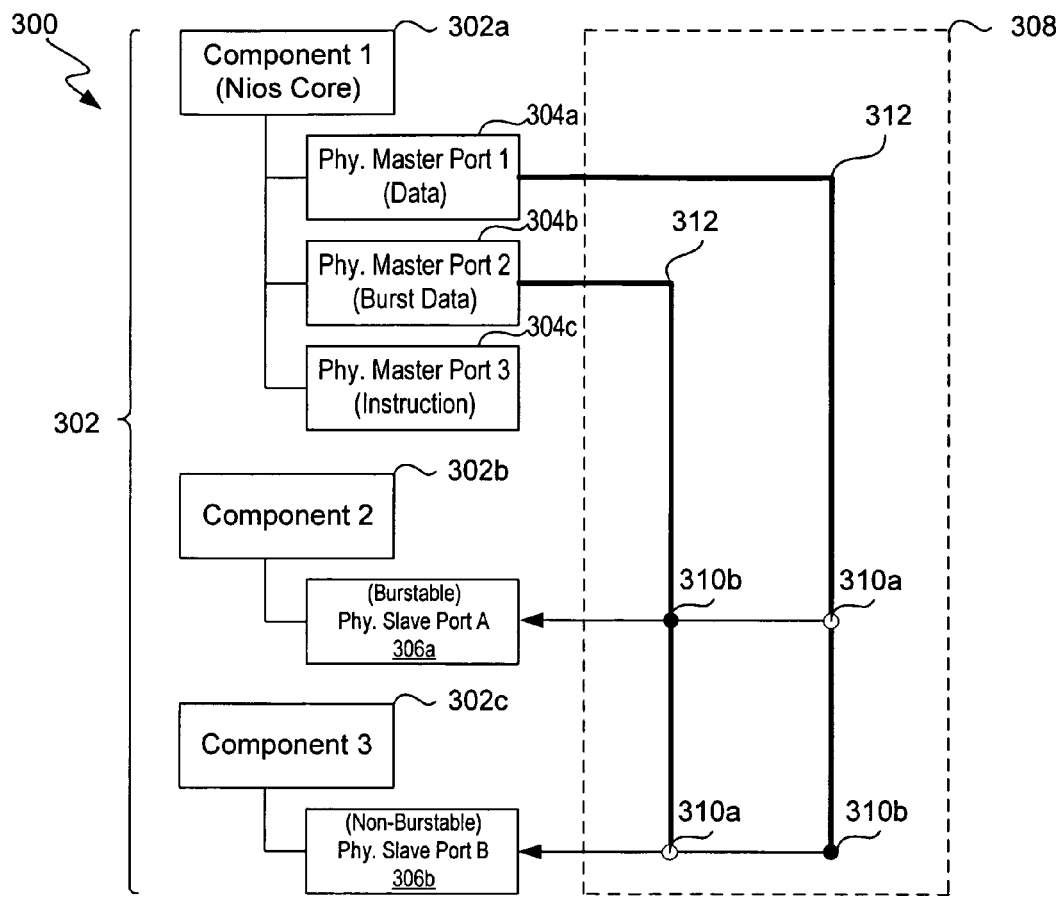
FIG. 3A illustrates a physical representation of an electronic design according to a second embodiment of the present invention.

FIG. 3A illustrates a physical representation of an electronic design 300 according to a second embodiment of the present invention. Electronic design 300 includes multiple components 302, such as component 1 (i.e., 302a), component 2 (i.e., 302b), and component 3 (i.e., 302c). In this specific embodiment, component 1 is representative of at least a portion of a processor such as a Nios Core, which is available from Altera Corporation of San Jose, Calif. Each component may have any number of physical master ports 304 (e.g., 304a, 304b, 304c) and/or physical slave ports 306 (e.g., 306a, 306b). For instance, component 1 has three physical master ports 304a (data), 304b (burst data), and 304c (instruction), component 2 has one physical slave port 306a, and component 3 has one physical slave port 306b. Each port may be associated with a particular functionality, such as support for either burstable or non-burstable data transfers.

A patch panel 308 is provided to facilitate with interconnecting various components of electronic design 300. Patch panel 308 includes interconnects 312 and nodes 310a and 310b. Interconnects 312 extend to or from ports 304/306 and are used to interconnect the various ports of components 302. As shown in FIG. 3A, nodes 310a or 310b may be used to receive an indication to connect or disconnect corresponding interconnects 312 and components/ports. Besides the implementation of patch panel 308, it will be appreciated by those skilled in the art that other mechanisms or techniques may be used to interconnect the various ports/components.

Figure 3B:
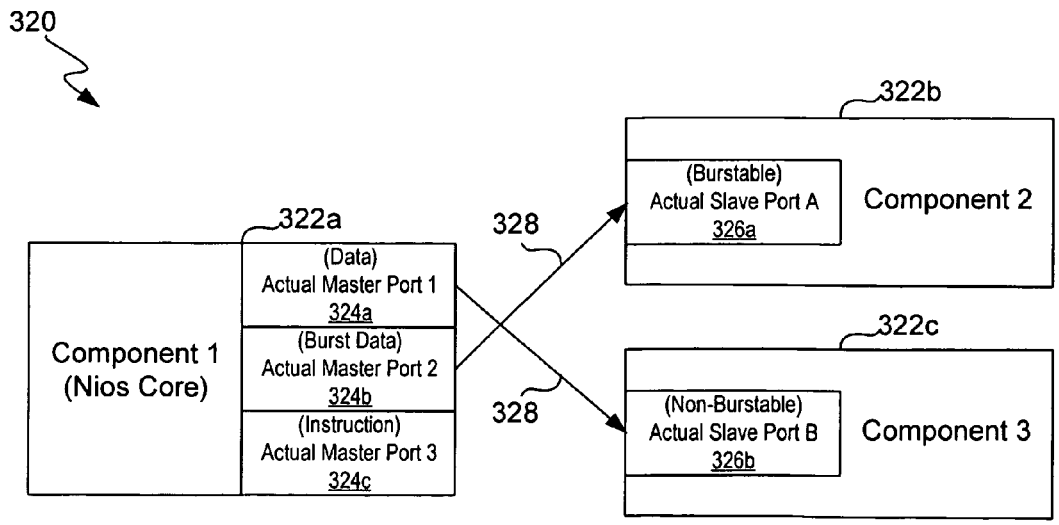
FIG. 3B illustrates a corresponding hardware representation of the electronic design in FIG. 3A.

It should be noted that each physical master/slave port corresponds to an actual hardware port in the electrical design. For instance, the physical master/slave port is a physical representation of the actual hardware port in the electrical design. As such, the physical master/slave port can provide a user with actual hardware connection information. To further elaborate, FIG. 3B illustrates a corresponding hardware representation 320 of the electronic design in FIG. 3A. Component 1 (322a), actual master port 1 (324a), actual master port 2 (324b), and actual master port 3 (324c) correspond respectively to elements 302a, 304a, 304b, and 304c of electronic design 300. Similarly, component 2 (322b), actual slave port A (326a), component 3 (322c), and actual slave port B (326b) correspond respectively to elements 302b, 306a, 302c, and 306b. Actual interconnects 328 are represented by interconnects 312 and nodes 310b of patch panel 308 in FIG. 3A.

In some cases, choosing a correct physical master port to connect to a particular physical slave port may unnecessarily burden the user. For example, a Nios Core (i.e., 302a) typically has ports for data and instruction. However, the port for data may or may not support burst data transfers. Therefore, the user would have to choose one of the two ports (e.g., 304a, 304b) to optimize a slave port/component connection. That is, based on the supported functionality (e.g., burstable data transfers) of selected slave component/port, a user would have to connect a corresponding master component/port that also shares the same supported functionality in order to optimize the connection for the pair of selected components/ports.

Figure 4A:
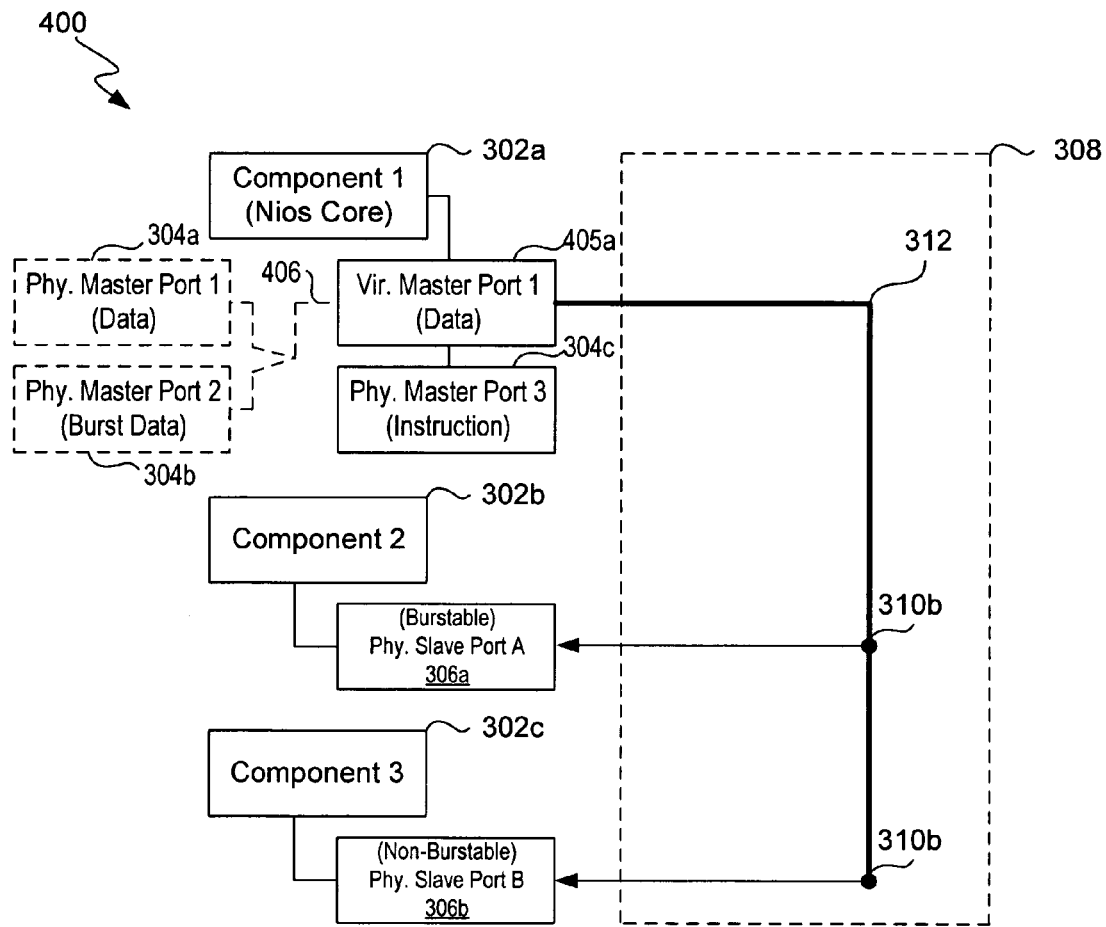
FIG. 4A illustrates both physical and virtual representations of an electronic design according to a second embodiment of the present invention.

In order to effectively provide information to a user about interconnections in a design and/or control how the interconnections are made, simple and practical visual representations and redirection mechanisms (e.g. mappings) are provided. To further elaborate, FIG. 4A illustrates both physical and virtual representations of an electronic design 400 according to a second embodiment of the present invention. Electronic design 400 is similar to electronic design 300, but represented in both physical and virtual representations. Although component 1 (302a) includes physical master port 1 (304a) and physical master port 2 (304b), the ports are hidden/transparent (denoted by the dashed lines) to the user. Instead, virtual master port 1 (405a) is provided to the user. Virtual master port 1 is associated with physical master ports 1 (304a) and 2 (304b) via a redirection mechanism such as a mapping 406.

Figure 4B:
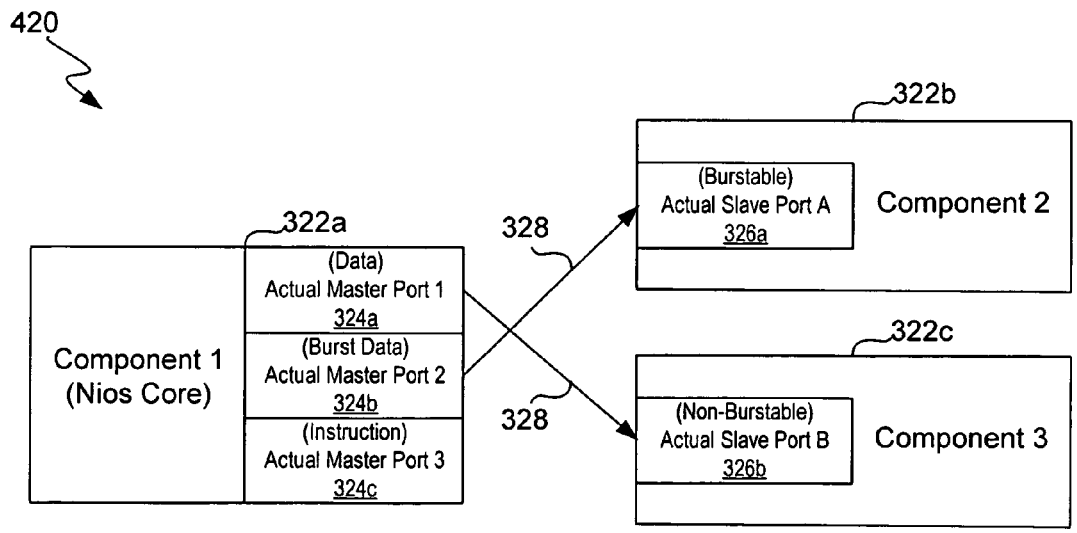
FIG. 4B illustrates a corresponding hardware representation of the electronic design in FIG. 4A.

By having a virtual master port mapped to more physical master ports (e.g., where more than one physical master port is mapped to a common virtual master port), the user can be provided with a simpler representation of interconnection information and an easier method of making the correct connections between components/ports. For example, in reference to component 1 of FIG. 3, a user would need to determine which one of the physical master ports 304a and 304b supports burst data transfer in order to connect correctly physical slave port A (306a), which is associated with a burstable data transfer functionality. However, in reference to component 1 of FIG. 4, the user need not be burdened with making this determination. Instead, the user merely needs to select node 310b for connecting physical slave port A (306a) to virtual master port 1 (405a), which is mapped to both physical master port 1 (304a) and physical master port 2 (304b). Alternatively, the selection of node 310b can be performed automatically based on the received components in the electronic design. For example, automatic hook up between matching components (such as components with prefetchable memory reads capabilities) can be performed.

Based on mapping 406 and the functionalities supported by the selected physical slave port, the correct physical master port will be chosen for connecting to the selected physical slave port. That is, since physical slave port A (306a) supports burstable data transfers, it will be connected to a functionality compliant physical master port such as physical master port 2 (304b). Similarly, physical slave port B (306b) would be connected to physical master port 1 (304a). As such, the user can easily create electronic design 400 without being substantially burdened with selecting the correct components/ports for connection.

In electronic design 400, a patch panel 308 is provided to the user for receiving an indication (e.g., from the user) to connect or disconnect various components/ports together. As shown, patch panel 308 includes interconnects 312 and nodes 310*a* and 310*b* for interconnecting virtual master port 1 to either physical slave port A (306*a*) of component 2 (302*b*) or physical slave port B (306*b*) of component 3 (302*c*). Based on the connections made, a corresponding hardware representation 420 of electronic design 400 is created and illustrated in FIG. 4B. Component 1 (322*a*), actual master port 1 (324*a*), actual master port 2 (324*b*), and actual master port 3 (324*c*) correspond respectively to elements 302*a*, 304*a*, 304*b*, and 304*c* of electronic design 400. Similarly, component 2 (322*b*), actual slave port A (326*a*), component 3 (322*c*), and actual slave port B (326*b*) correspond respectively to elements 302*b*, 306*a*, 302*c*, and 306*b*. Actual interconnects 328 are represented by interconnects 312 and nodes 310*b* of patch panel 308 in FIG. 4A.

Figure 5A:
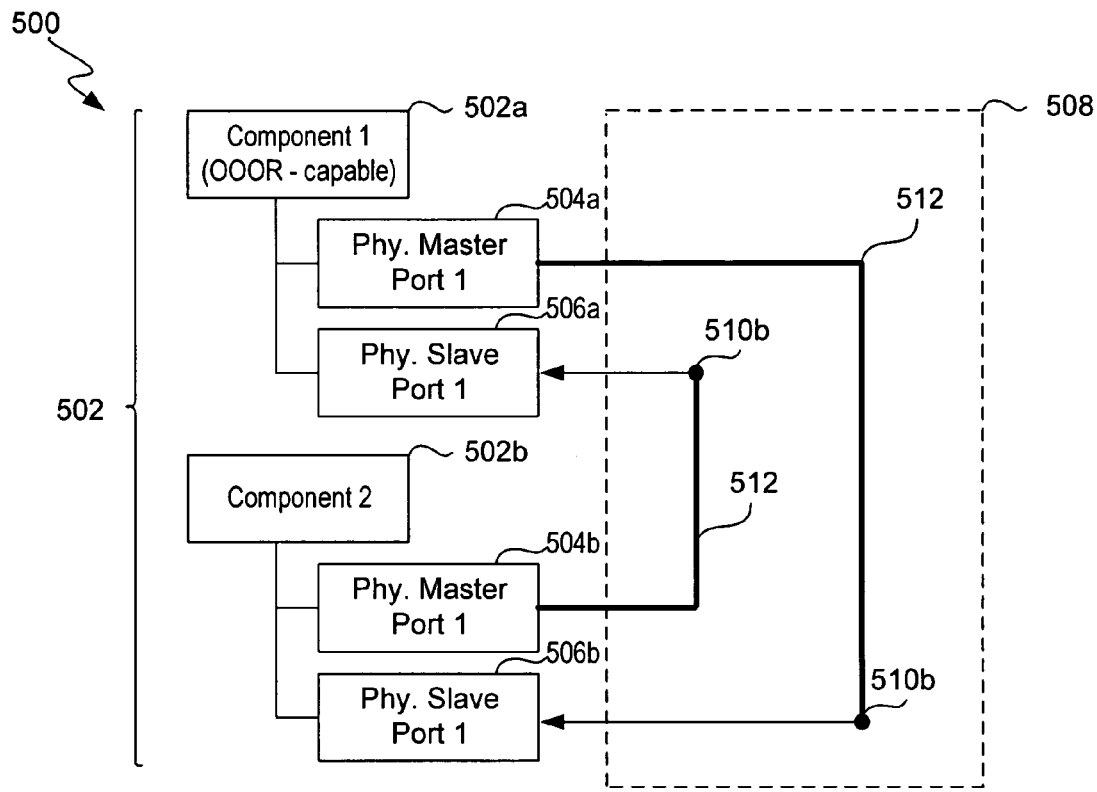
FIG. 5A illustrates a physical representation of an electronic design according to a third embodiment of the present invention.

FIG. 5A illustrates a physical representation of an electronic design according to a third embodiment of the present invention. Electronic design 500 includes multiple components 502, such as component 1 (i.e., 502*a*) and component 2 (i.e., 502*b*). In this specific embodiment, component 1 is representative of at least a portion of an out-of-order-read (OOOR) capable component. As shown, component 1 has one physical master port 1 (504*a*) and one physical slave port 1 (506*a*). Similarly, component 2 has one physical master port 1 (504*b*) and one physical slave port 1 (506*b*). A component/port may be associated with a particular functionality, such as OOOR capability. In a specific embodiment, OOOR capability includes having two channels flowing in opposite directions. Writes and Read Requests occur in one channel while Read Responses occur in the opposite channel.

A patch panel 508 is provided to facilitate interconnecting various components of electronic design 500. Patch panel 508 includes interconnects 512 and nodes 510*b*. Interconnects 512 extend to or from ports 504/506 and are used to interconnect the various ports of components 502. As shown in FIG. 5A, nodes 310*b* indicate a first connection between physical master port 1 (504*b*) and physical slave port 1 (506*a*) and a second connection between physical slave port 1 (506*b*) and physical master port 1 (504*a*). Generally, an arrow at the end of a connection indicates the direction in which information flows in the connection.

Figure 5B:
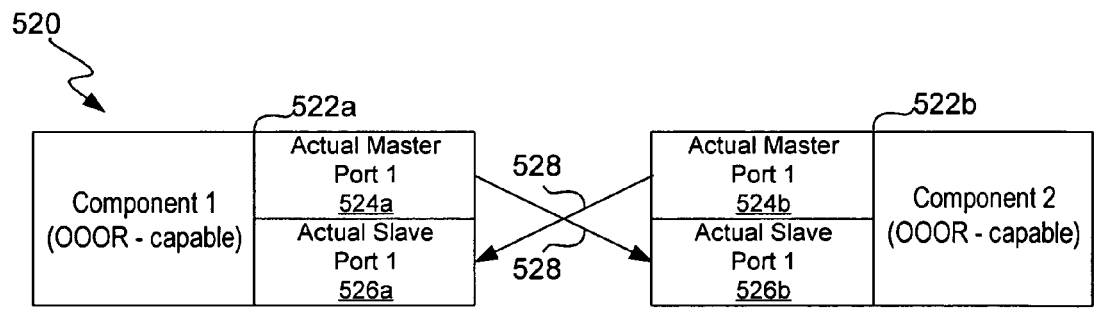
FIG. 5B illustrates a corresponding hardware representation of the electronic design in FIG. 5A where an OOOR-capable component is connected to another OOOR-capable component.

It should be noted again that each physical master/slave port corresponds to an actual hardware port in the electrical design. For instance, the physical master/slave port is a physical representation of the actual hardware port in the electrical design. To further elaborate, FIG. 5B illustrates a corresponding hardware representation of the electronic design in FIG. 5A where an OOOR-capable component is connected to another OOOR-capable component. Component 1 (522*a*), actual master port 1 (524*a*), and actual slave port 1 (526*a*) correspond respectively to elements 502*a*, 504*a*, and 506*a* of electronic design 500. Similarly, component 2 (522*b*), actual master port 1 (524*b*), and actual slave port 1 (526*b*) correspond respectively to elements 502*b*, 504*b*, and 506*b*. Actual interconnects 528 are represented by interconnects 512 and nodes 510*b* of patch panel 508 in FIG. 5A.

Choosing a correct physical master port to connect to a particular physical slave port may unnecessarily burden the user. For example, an OOOR-capable component typically has both master and slave ports. Accordingly, matching the master port of one component to a slave port of another component may be easily performed. However, if one of the components is not OOOR-capable, an adaptor must be used between the OOOR-capable component and the non-OOOR-capable component. Determining whether the connecting components are OOOR-capable and then connecting them accordingly may unnecessarily burden the user.

Figure 6A:
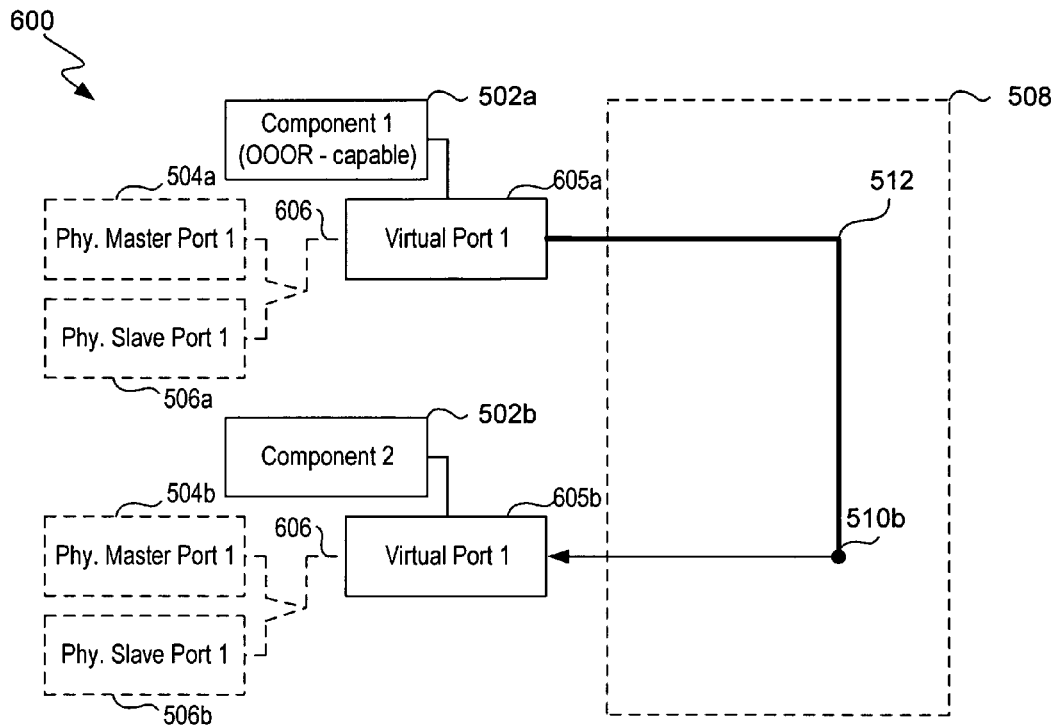
FIG. 6A illustrates both physical and virtual representations of an electronic design according to a third embodiment of the present invention.

In order to effectively provide information to a user about interconnections in a design and/or control how the interconnections are made, simple and practical visual representations and redirection mechanisms (e.g. mappings) are again provided. To further elaborate, FIG. 6A illustrates both physical and virtual representations of an electronic design 600 according to a third embodiment of the present invention. Electronic design 600 is similar to electronic design 500, but represented in both physical and virtual representations. Although component 1 (502*a*) includes physical master port 1 (504*a*) and physical slave port 1 (506*a*), the ports are hidden/transparent (denoted by the dashed lines) to the user. Instead, virtual master port 1 (605*a*) is provided to the user. Virtual port 1 (605*a*) is associated with physical master port 1 (504*a*) and physical slave port 1 (506*a*) via a redirection mechanism such as a mapping 606.

By having a virtual port mapped to more physical ports (e.g., where more than one physical port is mapped to a common virtual port), the user can be provided with a simpler representation of interconnection information and an easier method for making the correct connections between components/ports. For example, in reference to components 1 and 2 of FIG. 5, a user would need to determine which physical master port of one component connects to which physical slave port of another component, especially when there are multiple master-slave port connections between the two components. However, in reference to components 1 and 2 of FIG. 6A, the user need not be substantially burdened with making this determination. Instead, the user merely needs to select node 510*b* for making all the correct connections between physical master ports 1 (504*a* and 504*b*) and physical slave ports (506*a* and 506*b*). Alternatively, the selection of node 510*b* can be performed automatically based on the received components (e.g., matching components) in the electronic design.

Based on mappings 606 and the functionalities supported by the selected components, physical master ports will be correctly connected to physical slave ports of the selected components. As such, the user can easily create electronic design 600 without being substantially burdened with selecting the correct components/ports for connection.

Figure 6B:
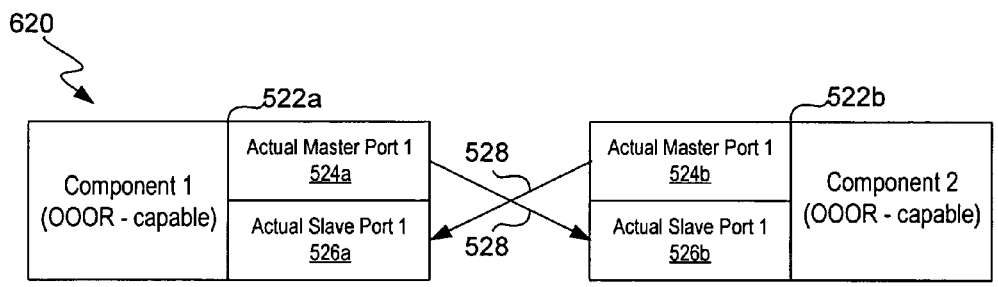
FIG. 6B illustrates a corresponding hardware representation of the electronic design in FIG. 6A where an OOOR-capable component is connected to another OOOR-capable component.

In electronic design 600, a patch panel 508 is provided for receiving an indication (e.g., from the user) to connect or disconnect various components/ports. As shown, patch panel 508 includes interconnects 512 and node 510*b* for interconnecting virtual port 1 (605*a*) of component 1 to virtual port 1 (605*b*) of component 2. Based on the connections made, a corresponding hardware representation 620 of electronic design 600 is created and illustrated in FIG. 6B. Component 1 (522*a*), actual master port 1 (524*a*), and actual slave port 1 (526*a*) correspond respectively to elements 502*a*, 504*a*, and 506*a* of electronic design 600. Similarly, component 2 (522*b*), actual master port 1 (524*b*), and actual slave port 1 (526*b*) correspond respectively to elements 502*b*, 504*b*, and 506*b*. Actual interconnects 528 are represented by interconnects 512 and node 510*b* of patch panel 508 in FIG. 6A.

Figure 6C:
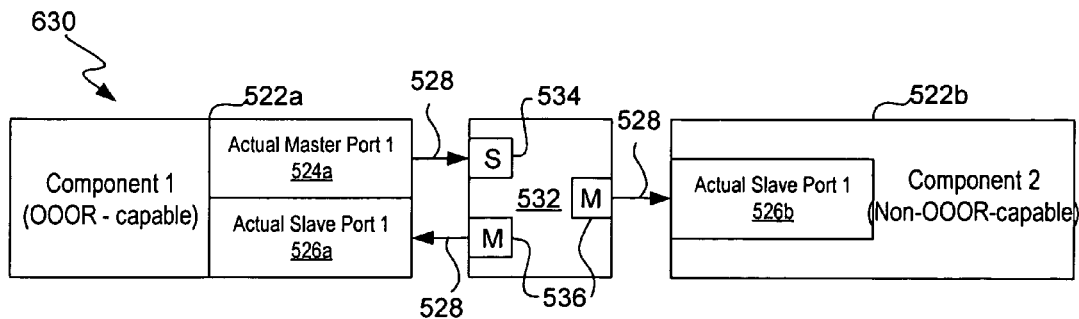
FIG. 6C illustrates a similar hardware representation of the electronic design in FIG. 6A where an adaptor is used for connecting an OOOR-capable component to a non-OOOR-capable component.

In addressing non-OOOR-capable components, mapping 606 (i.e., redirection mechanism) may be operable to determine whether the connecting components are OOOR-capable. If not, an adaptor can be automatically provided and connected between an OOOR-capable component and a non- OOOR-capable component. FIG. 6C illustrates a similar hardware representation 630 of the electronic design in FIG. 6A where an adaptor 532 is used for connecting an OOOR-capable component to a non-OOOR-capable component. As shown, adaptor 532 includes a slave port 534 and two master ports 536. The slave port 534 is connected to actual master port 1 (524a) via interconnect 528. One of the master ports 536 is connected to actual slave port 1 (526a) via interconnect 528 whereas the other master port 536 is connected to actual slave port 1 (526b) via interconnect 528. Adaptor 532 is operable to facilitate communication between component 1 (OOOR-capable) and component 2 (non-OOOR-cap able).

Process Flow Diagrams

Figure 7:
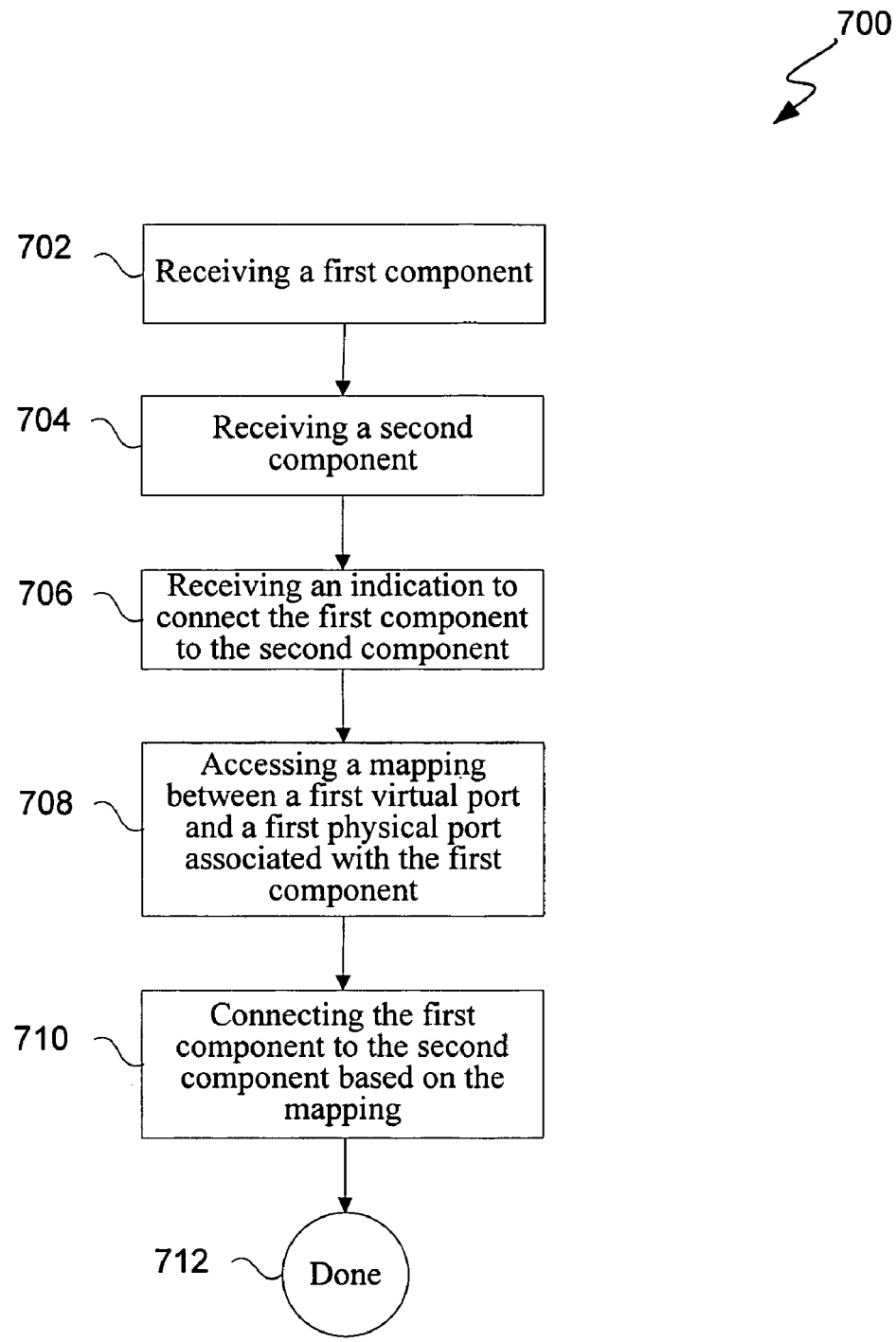
FIG. 7 illustrates a process flow for interconnecting components in an electronic design according to various embodiments of the present invention.

FIG. 7 illustrates a process flow 700 for interconnecting components in an electronic design according to various embodiments of the present invention. Process flow 700 begins with receiving multiple components of the electronic design. For instance, a first component is received at operation 702 and a second component is received at operation 704. Operations 702 and 704 may include receiving the components from a library and/or receiving parameter information associated with the components.

At operation 706, an indication to connect the first component to the second component is received. The indication can be based on a manual selection to connect the first and second components. For instance, the user may toggle an open node to a closed node between intersecting interconnects in the patch panel. The "made" connections (i.e., indicated by the closed nodes) will correspond to the ports of the components desired by the user for interconnection. Alternatively, the indication can be based on an automatic selection to connect the first and second component together.

Ports associated with the components may include physical or virtual ports.

In one embodiment, virtual master ports associated with the first component are coupled to physical slave ports associated with the second component. In another embodiment, physical and virtual ports are associated with a simultaneous multiple primary component fabric. Generally, the simultaneous multiple primary component fabric allows multiple master components/ports to communicate with multiple slave components/ports simultaneously. For example, a simultaneous multiple primary component fabric integrated system is described in U.S. patent application Ser. No. 10/227,504, filed Aug. 23, 2002, the contents of which are hereby incorporated by reference.

At operation 708, a mapping between a first virtual port and a first physical port associated with the first component is accessed. According to a specific embodiment, the first virtual port would be visible to the user whereas the first physical would be hidden from the user. It should be noted that the mapping between virtual ports and physical ports could be selected based on the level of information the user may need in each particular application. For example, in order to increase the amount of component connection information provided to a user, applications may implement a mapping that associates multiple virtual ports to a single physical port. For another example, in order to decrease the amount of component connection information provided to a user, applications may implement a mapping that associates a single virtual port to multiple physical ports. As such, a user can be provided with just the right amount of component connection information needed to efficiently create an electronic design.

The mapping can take into account the functionality supported by the first virtual port and/or the first physical port associated with the first component. For instance, in the case where the first component is a PCI Core, the mapping will correlate a first virtual port associated with prefetchable memory reads capability to a first physical port, which corresponds to an actual port of the PCI Core. However, in the case where the first component is a Nios Core, the mapping will correlate a first virtual port to a first physical port associated with burst data transfers, which corresponds to an actual port of the PCI Core.

Next, connecting the first component to the second component based on the mapping is performed in operation 710. Finally, process flow 700 ends at operation 712. It will be obvious to those skilled in the art that any portion of process flow 700 may be omitted, modified, or repeated to provide and/or control design data in accordance to the present invention. For example, interconnecting other components can be realized by repeating operations 702, 704, 706, 708, and 710.

Figure 8:
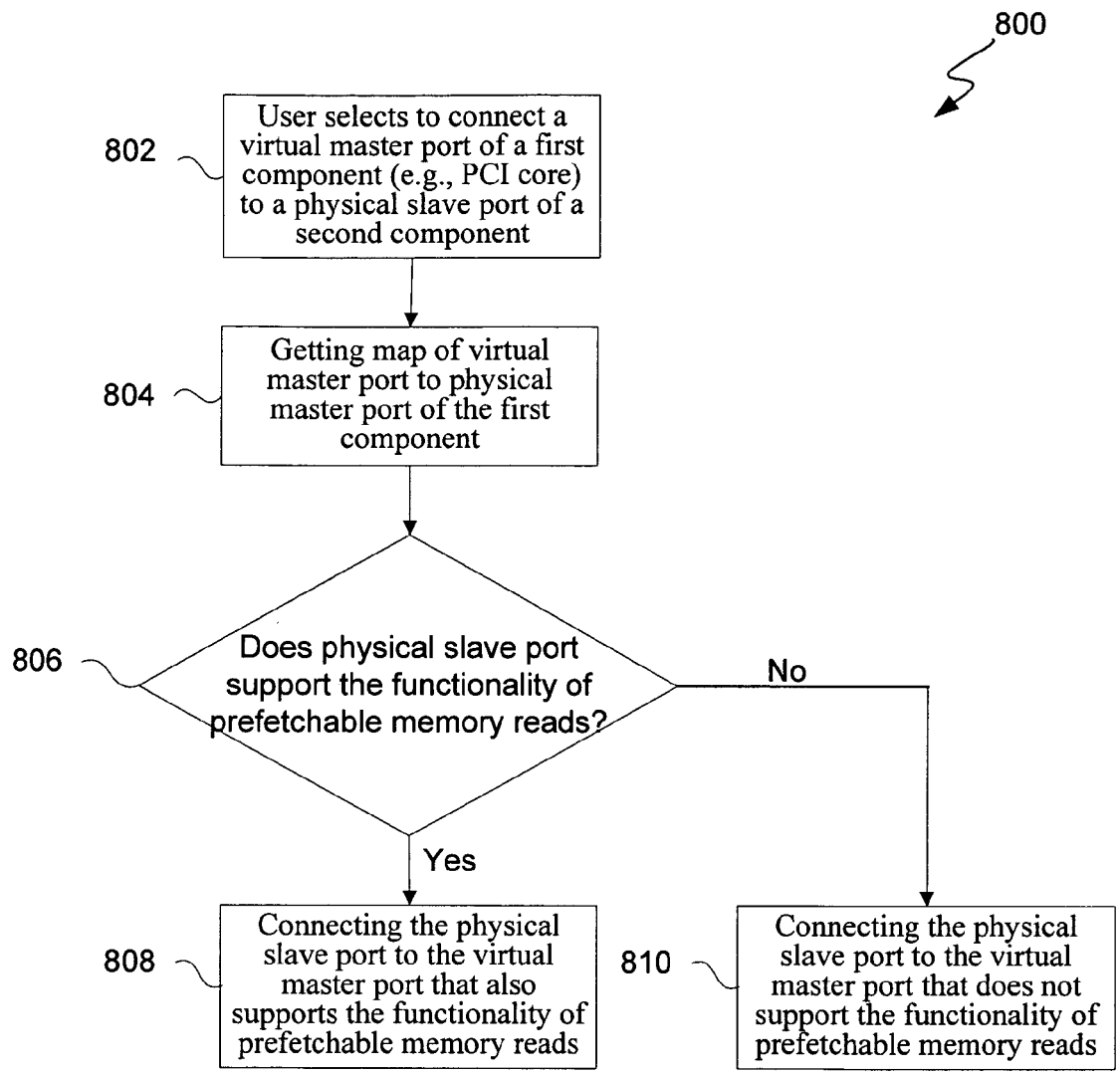
FIG. 8 illustrates a process flow for interconnecting components in an electronic design according to a first embodiment of the present invention.

FIG. 8 illustrates a process flow 800 for interconnecting components in an electronic design according to a first embodiment of the present invention. Beginning at operation 802, a selection is made by a user to connect a virtual master port of a first component (e.g., PCI Core) to a physical slave port of a second component. Next, a map of the virtual master port to the physical master port of the first component is accessed in operation 804. Next, determining whether the physical slave port supports the functionality of prefetchable memory reads is performed in operation 806.

If the physical slave port supports prefetchable memory reads, then operation 808 is performed to connect the physical slave port to the virtual master port, which also supports the functionality of prefetchable memory reads. However, if the physical slave port does not support prefetchable memory reads, then operation 810 is performed to connect the physical slave port to a virtual master port that does not support the functionality of prefetchable memory reads.

Figure 9:
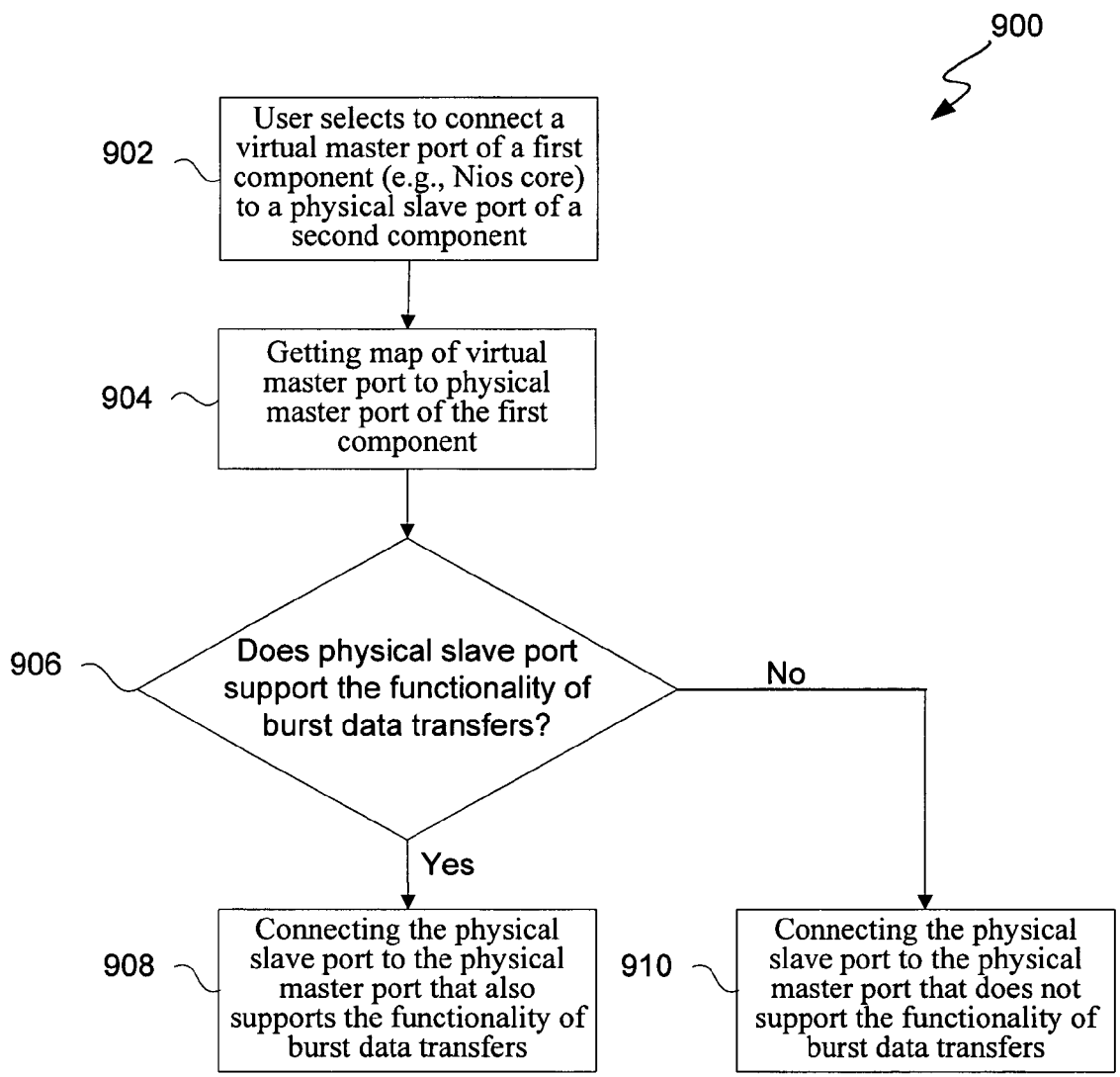
FIG. 9 illustrates a process flow for interconnecting components in an electronic design according to a second embodiment of the present invention.

FIG. 9 illustrates a process flow 900 for interconnecting components in an electronic design according to a second embodiment of the present invention. Beginning at operation 902, a selection is made by a user to connect a virtual master port of a first component (e.g., Nios Core) to a physical slave port of a second component. Next, a map of the virtual master port to the physical master port of the first component is accessed in operation 904. Next, determining whether the physical slave port supports the functionality of burst data transfers is performed in operation 906.

If the physical slave port supports burst data transfers, then operation 908 is performed to connect the physical slave port to the physical master port, which also supports the functionality of burst data transfers. However, if the physical slave port does not support burst data transfers, then operation 910 is performed to connect the physical slave port to a physical master port (of the first component) that does not support the functionality of burst data transfers.

Figure 10:
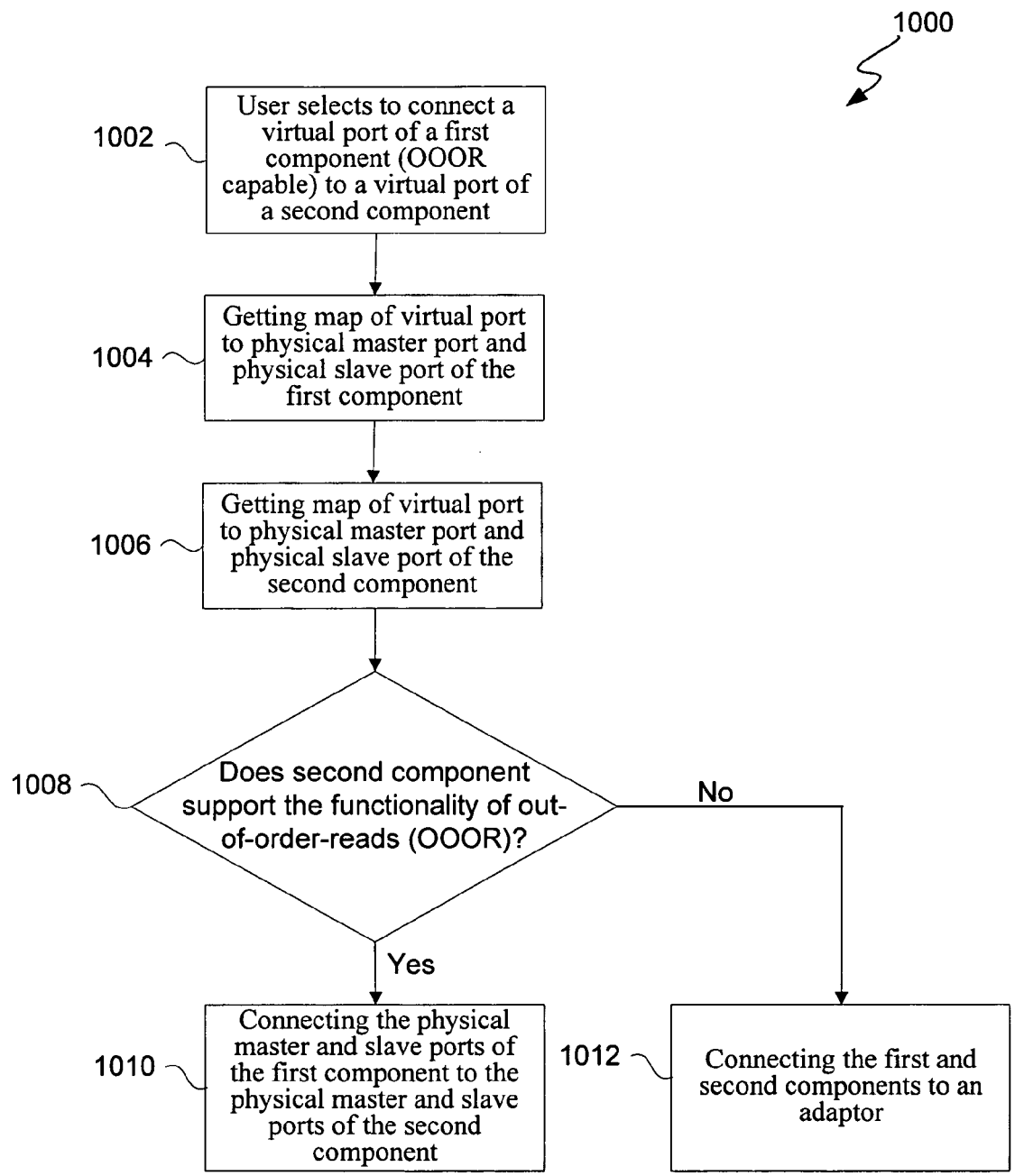
FIG. 10 illustrates a process flow for interconnecting components in an electronic design according to a third embodiment of the present invention.

FIG. 10 illustrates a process flow 1000 for interconnecting components in an electronic design according to a third embodiment of the present invention. Beginning at operation 1002, a selection is made by a user to connect a virtual port of a first component (e.g., OOOR-capable component) to a virtual port of a second component. Next, a map of the virtual port to the physical master port and to the physical slave port of the first component is accessed in operation 1004. Next, a map of the virtual port to the physical master port and to the physical slave port of the second component is accessed in operation 1006. Next, determining whether the second component supports the functionality of out-of-order-reads is performed in operation 1008.

If the second component supports OOOR, then operation 1010 is performed to connect the physical master and slave ports of the first component to the physical master and slave ports of the second component. However, if the second component does not support OOOR, then operation 1012 is performed to connect the first and second components to an adaptor (e.g., 532).

Figure 11:
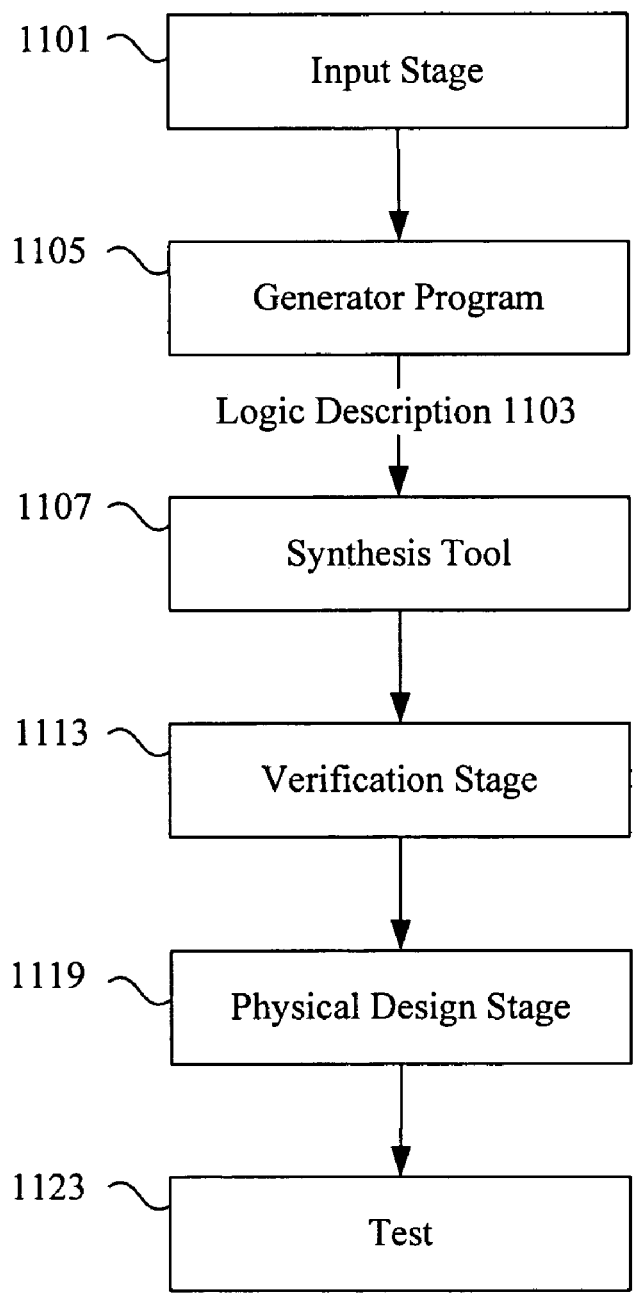
FIG. 11 is a diagrammatic representation showing implementation of a programmable chip.

FIG. 11 is a diagrammatic representation showing implementation of an electronic design in an electronic device (e.g., programmable chip) using a programmable chip tool. An input stage 1101 receives selection information typically from a user for logic such as a processor core as well as other components such as a streaming output device to be implemented on an electronic device. A generator program 1105 creates a logic description and provides the logic description along with other customized logic to any of a variety of synthesis tools, place and route programs, and logic configuration tools to allow a logic description to be implemented on an electronic device.

In one example, an input stage 1101 often allows selection and parameterization of components to be used on an electronic device. In some examples, components provided to an input stage include intellectual property functions, megafunctions, and intellectual property cores. The components may be stored and retrieved from a library or database. The input stage 1101 may be a graphical user interface using wizards for allowing efficient or convenient entry of information such as component interconnection information. The input stage may also be a text interface or a program reading a data file such as a spreadsheet, database table, or schematic to acquire selection information. The input stage 1101 produces an output containing information about the various components selected.

In typical implementations, the generator program 1105 can identify the selections and generate a logic description with information for implementing the various components. The generator program 1105 can be a Perl script creating HDL files such as Verilog, Abel, VHDL, and AHDL files from the module information entered by a user. According to various embodiments, the generator program 1105 also provides information to a synthesis tool 1107 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 1101, generator program 1105, and synthesis tool 1107 can be separate programs. The interface between the separate programs can be a database file, a log, or simply messages transmitted between the programs. For example, instead of writing a file to storage, the input stage 1101 can send messages directly to the generator program 1105 to allow the generator program to create a logic description. Similarly, the generator program can provide information directly to the synthesis tool instead of writing HDL files. Similarly, input stage 1101, generator program 1105, and synthesis tool 1107 can be integrated into a single program.

For example, SOPC Builder tool available from Altera Corporation, San Jose, Calif. integrates different stages of the electronic device implementation into a single program while implementing various techniques and mechanisms of the present invention. In particular, SOPC Builder tool provides system-level design flows for SOPC architectures. SOPC Builder tool may automatically generate interconnect logic (e.g., Avalon™ switch fabric) connecting components used in SOPC applications. The components include embedded processors that may either be internal or external to the FPGA and peripherals.

A user may select various components and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1107.

A synthesis tool 1107 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1113 typically follows the synthesis stage 1107. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1113, the synthesized netlist file can be provided to physical design tools 1119 including place and route and configuration tools. A place and route tool typically locates logic cells on specific logic elements of a target hardware device and connects wires between the inputs and outputs of the various logic elements in accordance with logic required to implement an electronic design. The device can also be physically tested at 1123.

For programmable logic devices, a programmable logic configuration stage can take the output of the place and route tool to program the logic device with the user selected and parameterized components. According to various embodiments, the place and route tool and the logic configuration stage are provided in the Quartus Development Tool, available from Altera Corporation of San Jose, Calif.

As noted above, different stages and programs can be integrated in a variety of manners. According to one embodiment, the input stage 1101, the generator program 1105, the synthesis tool 1107, the verification tools 1113, and physical design tools 1119 are integrated into a single program. The various stages are automatically run and transparent to a user.

The program can receive the user-selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

System Embodiments

Figure 12:
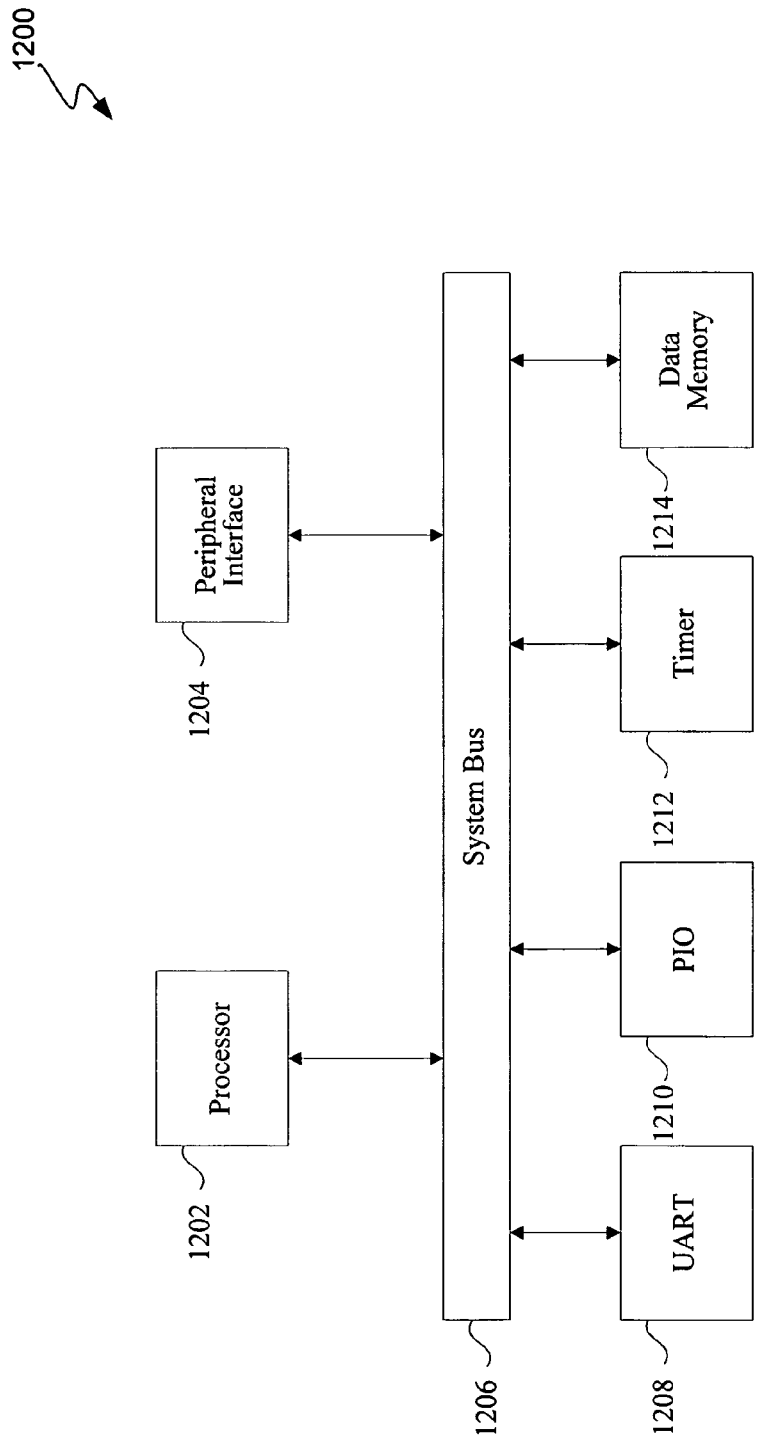
FIG. 12 is a diagrammatic representation showing a system on a programmable chip

FIG. 12 is a diagrammatic representation showing a digital system 1200 on a programmable chip having a processor core, peripheral devices, and peripheral interfaces. Peripheral devices and peripheral interfaces are herein referred to as components. The system on a programmable chip includes processor core 1202 and a peripheral interface 1204 as well as peripheral components UART 1208, PIO 1210, timer 1212, and data memory 1214. In some examples, the peripheral interface 1204 is a memory controller with an associated bus bridge. It should be noted that the system can include both on-chip and off-chip memory.

System bus 1206 provides interconnectivity amongst the components in digital system 1200. In one embodiment, system bus 1206 includes a conventional bus architecture. In another embodiment, system bus 1206 includes a simultaneous multiple primary component fabric, such as the Avalon™ Switch Fabric available from Altera Corporation, San Jose, Calif.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and fast cascade chain, register and preset/reset logic for the register.

Figure 13:
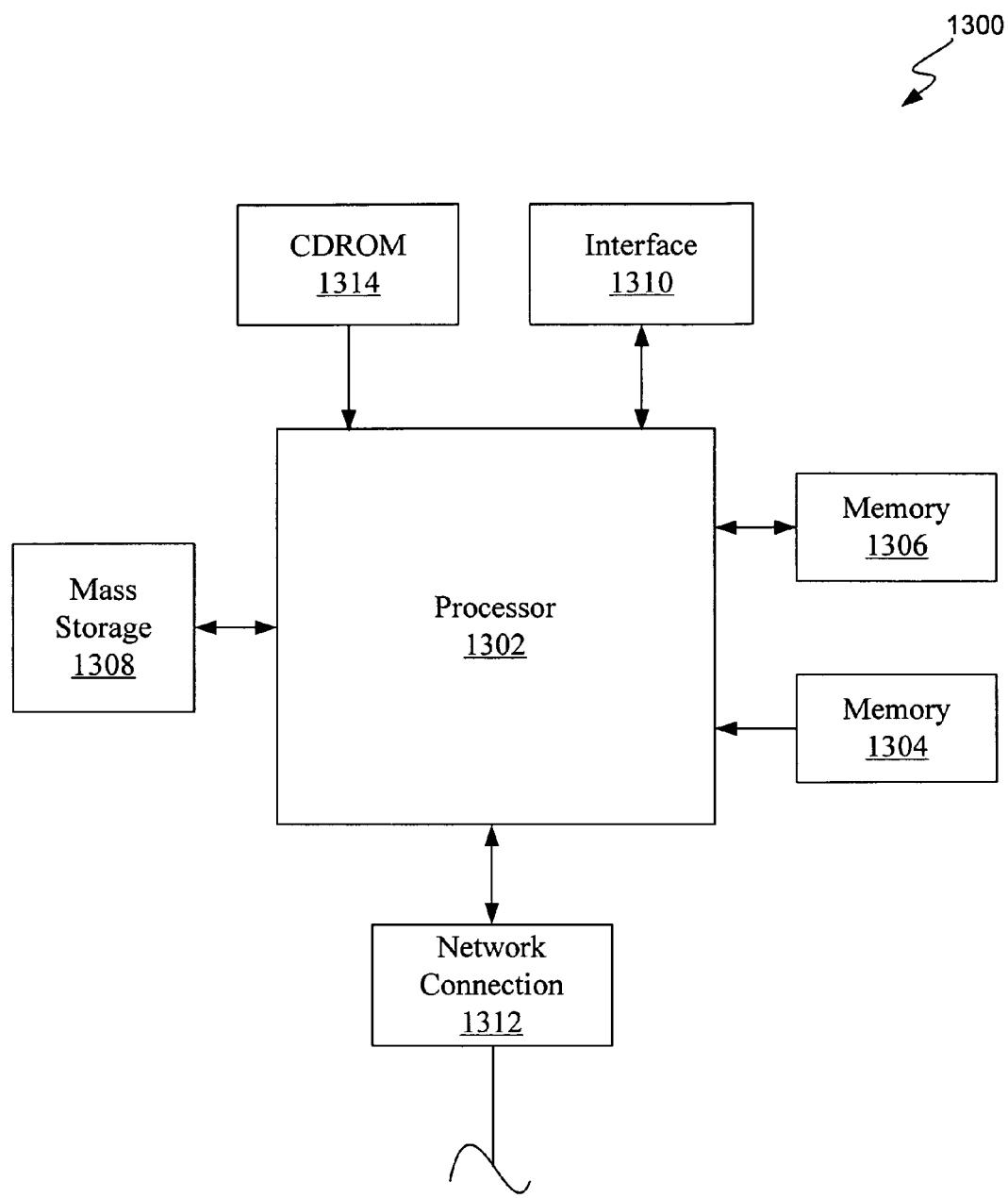
FIG. 13 illustrates a computer system suitable for implementing various embodiments of the present invention.

FIG. 13 illustrates a computer system suitable for implementing various embodiments of the present invention. The computer system 1300 includes any number of processors 1302 (also referred to as central processing units, or CPUs) that are coupled to devices including memory 1306 (typically a random access memory, or "RAM"), memory 1304 (typically a read only memory, or "ROM"). The processors 1302 can be configured to provide a graphics user interface with effective visual representations according to various embodiments of the present invention. Some representations may be specifically designed to display selective interrelated data, such as the master and/or slave connections of components, from programmable chip systems implementing any of a variety of different system architectures. In one example, programmable chip systems having multiple master and slave components are interconnected with conventional bus architectures. As is well known in the art, memory 1304 acts to transfer data and instructions uni-directionally to the CPU and memory 1306 is used typically to transfer data and instructions in a bi-directional manner.

Both of these memory devices may include any suitable type of the computer-readable media described above. A mass storage device 1308 is also coupled bi-directionally to CPU 1302 and provides additional data storage capacity and may include any of the computer-readable media described above. The mass storage device 1308 may be used to store programs, data and the like and is typically a secondary storage medium such as a hard disk that is slower than memory. The mass storage device 1308 can be used to hold a library or database of prepackaged logic or intellectual property functions, as well as information on generating particular configurations. It will be appreciated that the information retained within the mass storage device 1308, may, in appropriate cases, be incorporated in standard fashion as part of memory 1306 as virtual memory. A specific mass storage device such as a CD-ROM 1314 may also pass data uni-directionally to the CPU.

CPU 1302 is also coupled to an interface 1310 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Video monitors can be used to display wizards and subwizards to a user. Finally, CPU 1302 optionally may be coupled to a computer or telecommunications network using a network connection as shown generally at 1312. With such a network connection, it is contemplated that the CPU might receive information from the network, or might output information to the network in the course of performing the above-described method steps. It should be noted that the system 1300 may also be associated with devices for transferring completed designs onto a programmable chip. The above-described devices and materials will be familiar to those of skill in the computer hardware and software arts.

The hardware elements described above may be configured to act as multiple software modules for performing the operations of this invention. For example, instructions for running a tool, generator program, input stage (e.g., a wizard), and/or compiler may be stored on mass storage device 1308 or 1314 and executed on CPU 1302 in conjunction with primary memory 1306.

Other Embodiments

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, although the present invention has been discussed primarily in the context of connecting masters and slaves in a multi-master system, the present invention is suitable for connecting components of other systems and may be tailored correspondingly. For another example, the present invention may be applicable to any system design tool that considers connections to be "physical". Further, the present invention may be used with components of any suitable protocol/interface, such as an Avalon interface available from Altera Corporation of San Jose, Calif. Therefore, the scope of the invention should be determined with reference to the appended claims.

What is claimed is:

1. A method of interconnecting components in an electronic design, comprising:
   receiving a first component;
   receiving a second component;
   receiving an indication to connect the first component to the second component;
   connecting a first virtual port associated with the first component to the second component, the first virtual port having a mapping to a first physical port associated with the first component;
   determining that the first component is out-of-order read (OOOR) capable and that the second component is non-OOOR capable;
   adapting the OOOR-capable first component to the non-OOOR-capable second component; and
   implementing the first component and the second component on an electronic device.

2. The method of claim 1, wherein the mapping is part of a redirection mechanism.

3. The method of claim 1, wherein the mapping associates multiple virtual ports to a single physical port.

4. The method of claim 1, wherein the mapping associates a single virtual port to multiple physical ports.

5. The method of claim 1, wherein the first physical port is associated with a plurality of virtual ports.

6. The method of claim 5, wherein the first virtual port associated with the first physical port supports the functionality of prefetchable memory reads.

7. The method of claim 6, wherein a second virtual port associated with the first physical port supports the functionality of non-prefetchable memory reads.

8. The method of claim 1, wherein the first virtual port is associated with a plurality of physical ports.

9. The method of claim 8, wherein the first physical port associated with the first virtual port supports the functionality of burst data transfers.

10. The method of claim 9, wherein a second physical port associated with the first virtual port supports the functionality of non-burst data transfers.

11. The method of claim 1, wherein the operations of determining and adapting are automatically performed.

12. The method of claim 1, wherein the operation of connecting is based on the mapping, the mapping taking into account the supported functionality associated with either the first virtual port or the first physical port.

13. The method of claim 1, wherein the first component is a PCI core.

14. The method of claim 1, wherein the first component is a processor core.

15. The method of claim 1, wherein connecting to the second component is done through either a first virtual port or a first physical port associated with the second component.

16. The method of claim 15, wherein each pair of interconnected ports associated with the first and second components is configured as master-slave pairs.

17. A computer system for interconnecting components in an electronic design, comprising:
   an interface operable to receive a first component, a second component, and an indication to connect the first component to the second component; and
   a processor coupled to the interface, the processor operable to connect a first virtual port associated with the first component to the second component, the first virtual port having a mapping to a first physical port associated with the first component, wherein the processor is further operable to implement the first component and the second component on an electronic device;
   wherein the processor is configured to determine that the first component is out-of-order read (OOOR) capable and that the second component is non-OOOR capable and adapt the OOOR-capable first component to the non-OOOR-capable second component.

18. The computer system of claim 17, wherein the interface is further operable to receive the first and second components from a library; and receive parameter information associated with the first and second components.

19. The computer system of claim 18, wherein the interface is further operable to provide a connectable node in a patch panel for receiving the indication to connect.

20. The computer system of claim 17, wherein the mapping associates multiple virtual ports to a single physical port.

21. The computer system of claim 17, wherein the mapping associates a single virtual port to multiple physical ports.

22. A computer program product comprising a machine-readable medium on which is provided program instructions for interconnecting components in an electronic design, the program instructions comprising:
   instructions for receiving a first component;
   instructions for receiving a second component;
   instructions for receiving an indication to connect the first component to the second component;
   instructions for determining that the first component is out-of-order read (OOOR) capable and that the second component is non-OOOR capable;
   instructions for adapting the OOOR-capable first component to the non-OOOR-capable second component;
   instructions for connecting a first virtual port associated with the first component to the second component, the first virtual port having a mapping to a first physical port associated with the first component; and
   instructions for implementing the first component and the second component on an electronic device.

23. The computer program product of claim 22, wherein the mapping associates multiple virtual ports to a single physical port.

24. The computer program product of claim 22, wherein the mapping associates a single virtual port to multiple physical ports.

25. The computer program product of claim 22, wherein the first physical port is associated with a plurality of virtual ports.

26. The computer program product of claim 22, wherein the first virtual port is associated with a plurality of physical ports.

* * * * *